(12) United States Patent
Lévesque et al.

(10) Patent No.: US 12,552,115 B2
(45) Date of Patent: Feb. 17, 2026

(54) PROCESS FOR MANUFACTURING A COMPOSITE PANEL

(71) Applicant: HUTCHINSON AÉRONAUTIQUE & INDUSTRIE LTÉE, Montreal (CA)

(72) Inventors: Martin Lévesque, Quebec (CA); Jean-Philippe Larose, Quebec (CA); Franck Guillemand, Quebec (CA)

(73) Assignee: HUTCHINSON AÉRONAUTIQUE & INDUSTRIE LTÉE, Montreal (CA)

( * ) Notice: Subject to any disclaimer, the term of this patent is extended or adjusted under 35 U.S.C. 154(b) by 564 days.

(21) Appl. No.: 16/621,267

(22) PCT Filed: Jun. 18, 2018

(86) PCT No.: PCT/CA2018/050738
§ 371 (c)(1),
(2) Date: Dec. 11, 2019

(87) PCT Pub. No.: WO2018/227309
PCT Pub. Date: Dec. 20, 2018

(65) Prior Publication Data
US 2020/0384710 A1   Dec. 10, 2020

(30) Foreign Application Priority Data

Jun. 16, 2017 (CA) .................... 2971066

(51) Int. Cl.
*B29C 70/86* (2006.01)
*B29C 70/48* (2006.01)
(Continued)

(52) U.S. Cl.
CPC ............ *B29C 70/865* (2013.01); *B29C 70/48* (2013.01); *B29K 2307/04* (2013.01); *B29L 2031/3076* (2013.01); *B64D 11/06* (2013.01)

(58) Field of Classification Search
CPC ....... B29C 70/865; B29C 70/48; B29C 70/70; B29C 53/387; B29C 70/382; B29C 45/14631
(Continued)

(56) References Cited

U.S. PATENT DOCUMENTS 4,621,834 A * 11/1986 Aubry .................... B60G 11/44
  267/276
5,114,762 A    5/1992 Bontems et al.
(Continued)

FOREIGN PATENT DOCUMENTS

CA    2 760 287    11/2010
EP    1 946 912    7/2008
(Continued)

OTHER PUBLICATIONS

Kumar, "Effect of post-curing on thermal and mechanical behavior of GFRP composites" IOP Conf. Ser.: Mater. Sci. Eng. 75 012012 (Year: 2012).*
(Continued)

*Primary Examiner* — Michael A Tolin
*Assistant Examiner* — Hana C Page
(74) *Attorney, Agent, or Firm* — Millen, White, Zelano & Branigan, P.C.; Christopher W. Brody

(57) ABSTRACT

A process for manufacturing a composite panel includes providing at least one first ply of a woven or nonwoven dry material, the first ply defining a peripheral contour. A structuring element is placed inside the peripheral contour of said first ply, over at least one portion of this peripheral contour. A second ply of a woven or nonwoven dry material is placed so that said second ply covers both the first ply and the structuring element, or at least one portion of the first ply, which includes the peripheral contour, is folded over to cover the structuring element, and a second ply of a woven
(Continued)

Figures 2A, 2B, 2C:
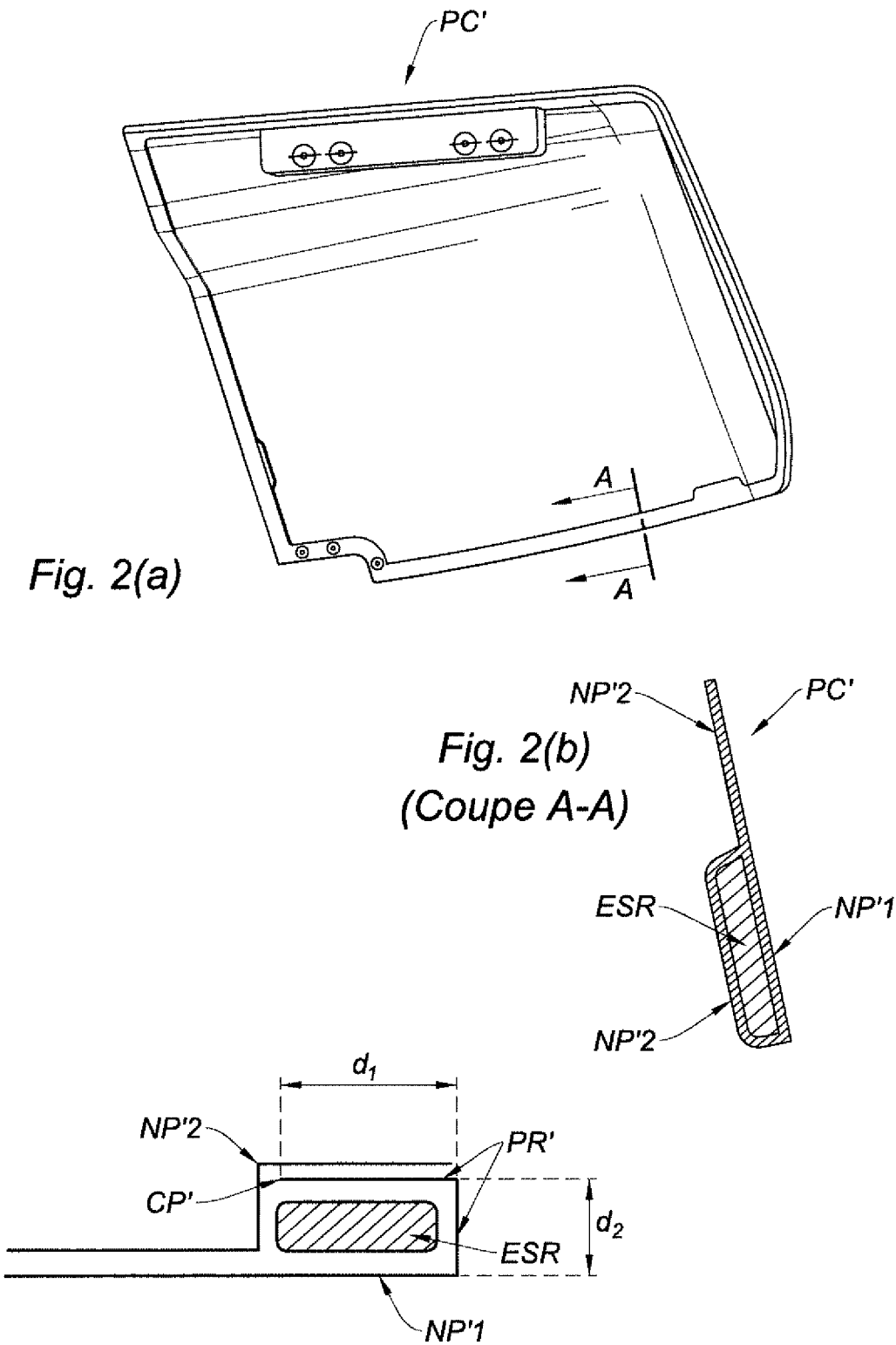
Figure 3A:
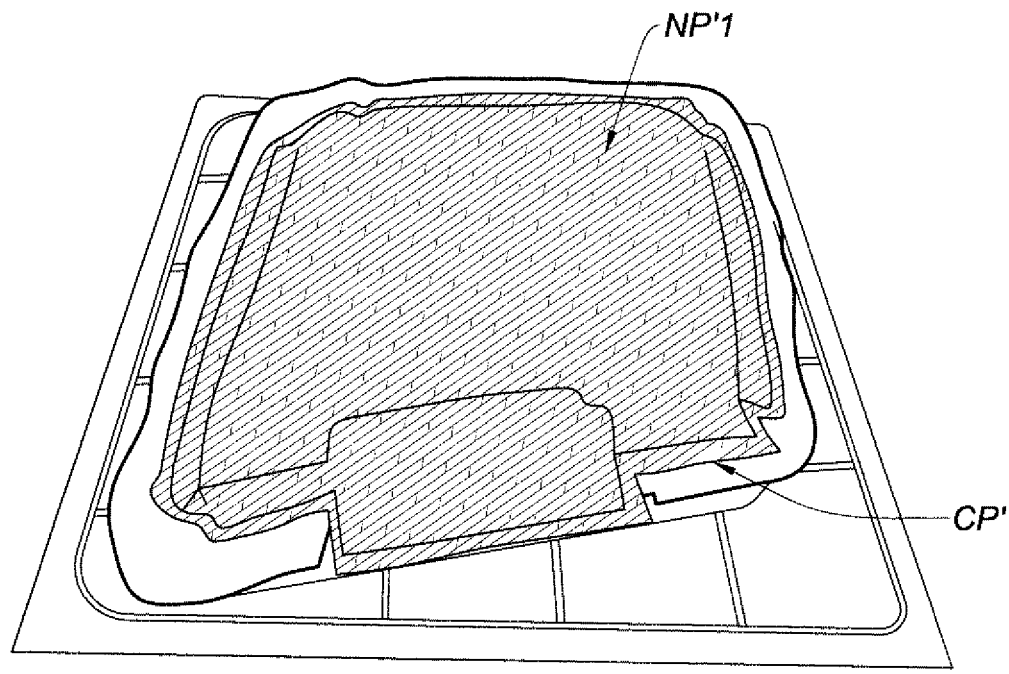
Figure 3B:
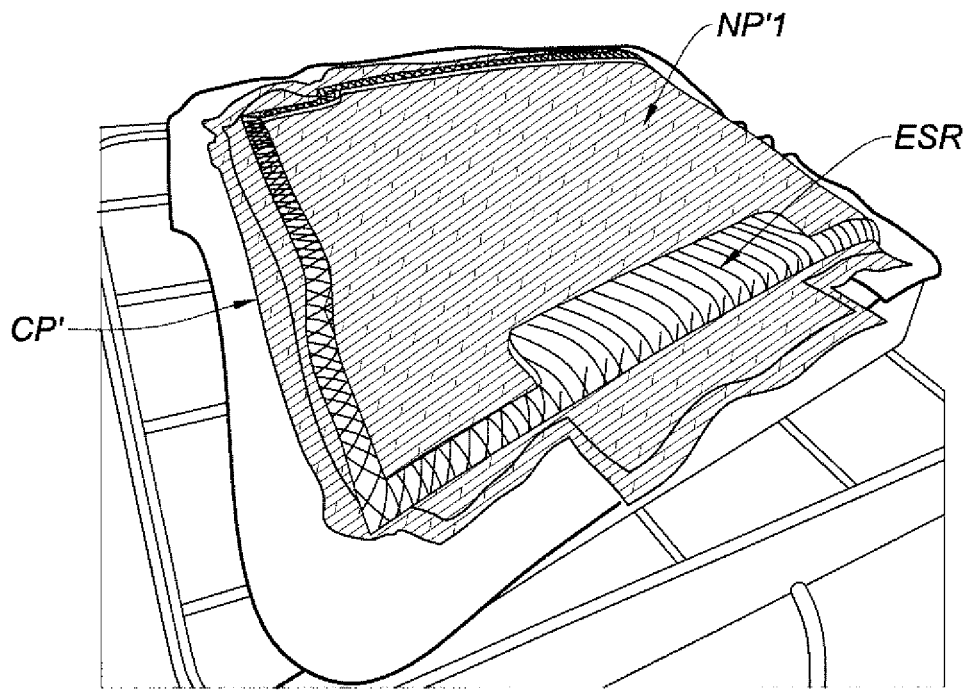
Figure 3C:
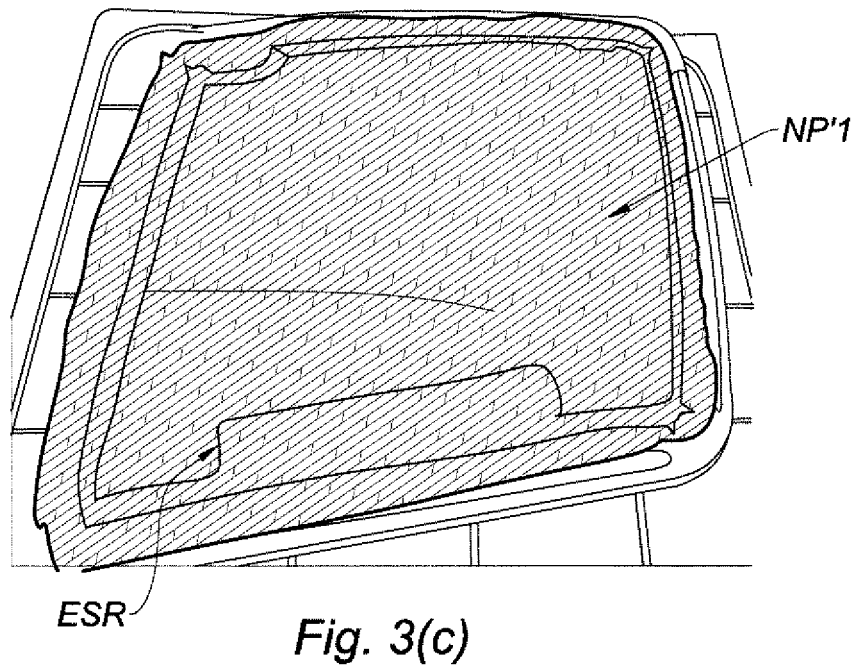
Figure 3D:
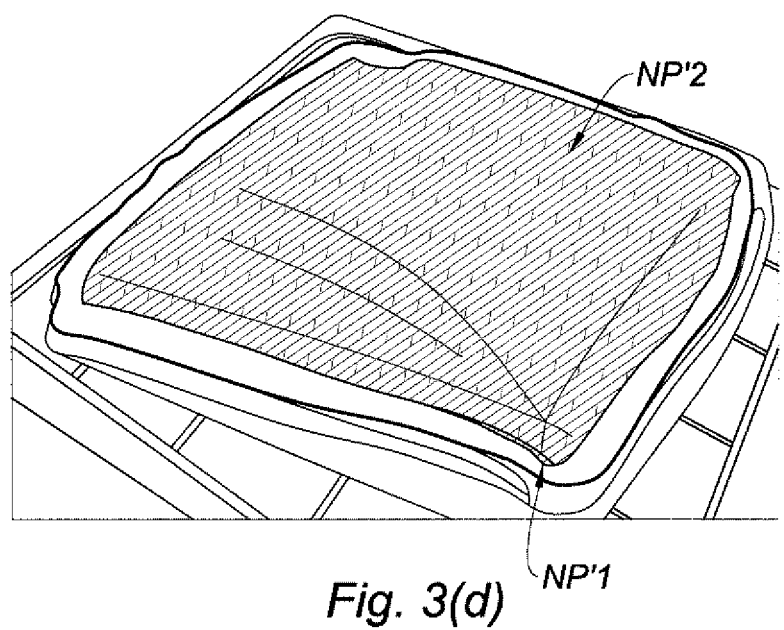
Figure 3E:
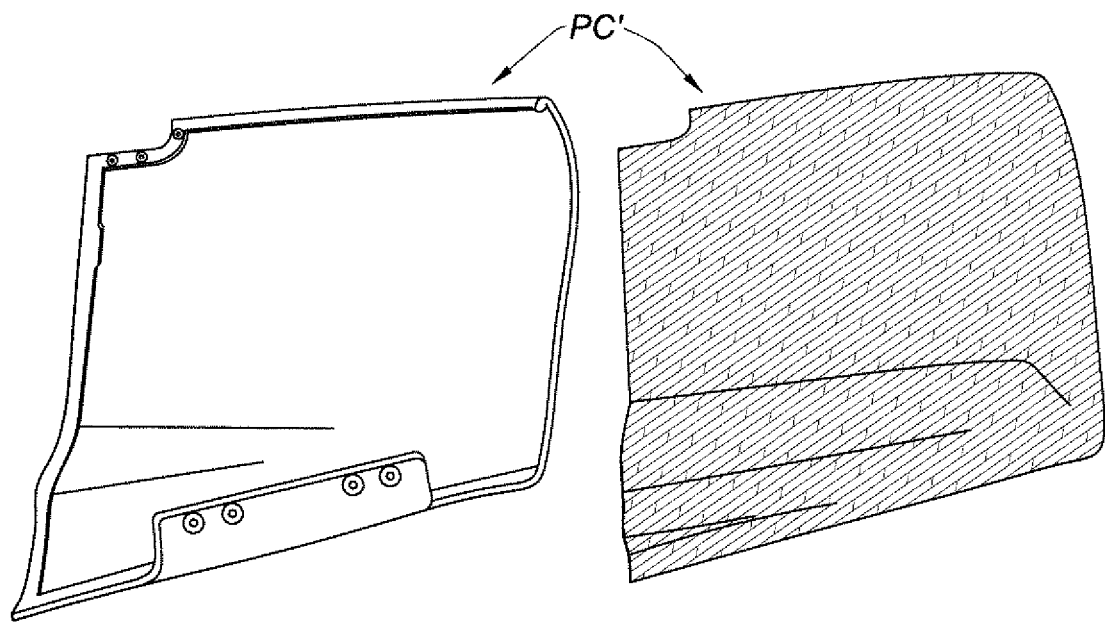

or nonwoven dry material is placed so that said second ply covers the first ply, but not the structuring element. A thermoplastic or thermosetting resin is injected into mould containing the stack to impregnating the plies. The impregnated piles are pressed into a composite panel.

17 Claims, 5 Drawing Sheets

(51) Int. Cl.
  *B29K 307/04* (2006.01)
  *B29L 31/30* (2006.01)
  *B64D 11/06* (2006.01)

(58) Field of Classification Search
  USPC .......................................................... 264/258
  See application file for complete search history.

(56) References Cited

U.S. PATENT DOCUMENTS

| | | | | |
|---|---|---|---|---|
| 6,352,609 | B1* | 3/2002 | Southmayd | B29C 33/3857 |
| | | | | 156/242 |
| 10,723,172 | B2* | 7/2020 | Walls-Bruck | B60B 21/12 |
| 2002/0053400 | A1* | 5/2002 | Lorenz | B29C 70/30 |
| | | | | 156/313 |
| 2005/0062338 | A1* | 3/2005 | Vernet | B60B 5/02 |
| | | | | 301/95.102 |
| 2007/0090684 | A1* | 4/2007 | Jager | B60B 5/02 |
| | | | | 301/58 |
| 2007/0205654 | A1 | 9/2007 | Denk et al. | |
| 2012/0238164 | A1* | 9/2012 | Touraud | B29C 70/52 |
| | | | | 427/398.1 |
| 2014/0333122 | A1* | 11/2014 | Werner | B29C 70/30 |
| | | | | 301/95.102 |
| 2014/0346845 | A1* | 11/2014 | Renner | B60B 3/004 |
| | | | | 301/64.704 |
| 2014/0375112 | A1* | 12/2014 | Werner | B60B 5/02 |
| | | | | 301/63.109 |
| 2017/0334154 | A1* | 11/2017 | Jones | B29C 70/34 |
| 2018/0002107 | A1* | 1/2018 | Fingerhut | B65D 88/12 |
| 2019/0134854 | A1* | 5/2019 | Kuroda | B29C 39/10 |
| 2019/0143611 | A1* | 5/2019 | Jones | B29C 70/081 |
| | | | | 264/258 |

FOREIGN PATENT DOCUMENTS

| | | | | |
|---|---|---|---|---|
| EP | 1946912 | A2 * | 7/2008 | ............. B29C 70/54 |
| GB | 1366773 | | 7/1972 | |
| GB | 2212436 | | 7/1989 | |
| GB | 2 547 468 | | 8/2017 | |
| JP | 2014-031015 | | 2/2014 | |
| WO | 83/03794 | | 11/1983 | |
| WO | 2016/015735 | | 2/2016 | |
| WO | 2016/087346 | | 6/2016 | |

OTHER PUBLICATIONS

English Translation of DE102004054345A1 (Year: 2004).*
Cheremisinoff (Condensed Encyclopedia of Polymer Engineering Terms 2001, pp. 255-267) applied as evidence only. (Year: 2001).*

* cited by examiner

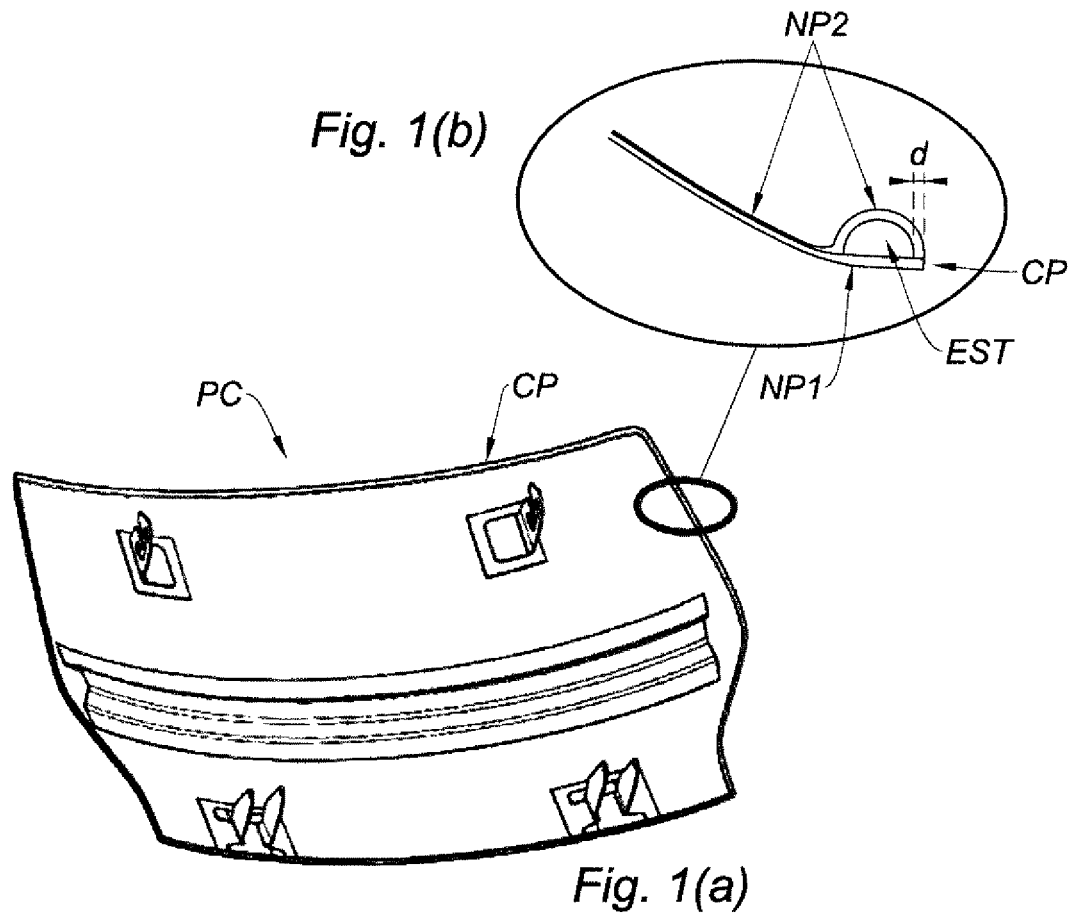
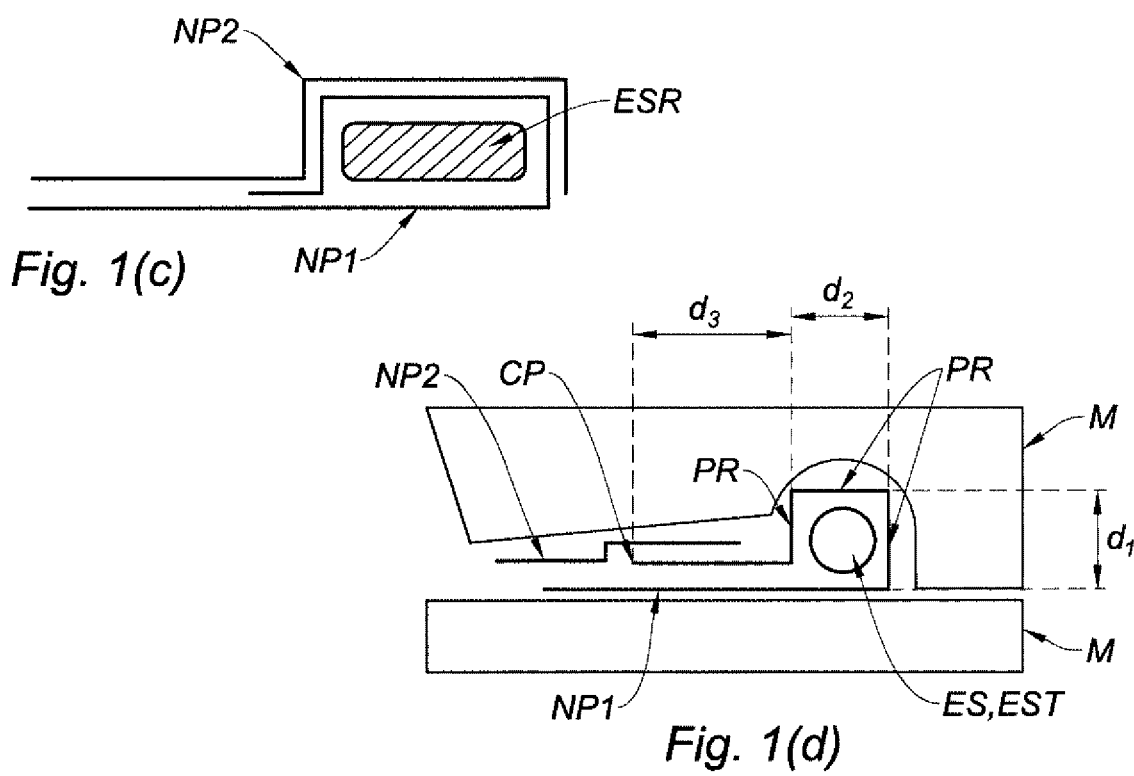

(Coupe A-A)

PROCESS FOR MANUFACTURING A COMPOSITE PANEL

The invention relates to a process for manufacturing a composite panel.

Such a panel can, in particular, form a seat component, for example an aeroplane seat.

Such a composite panel can be formed of a stack of plies, generally made with fibres, between which is located a structuring element which makes it possible to define the contour of the panel.

Conventional processes are based on the production of this stack, then the manufacture thereof, strictly speaking in a mould. However, these conventional processes require, after having manufactured the panel, to produce a cut to define the clear-cut shape of the contour of the panel.

This cutting step requires a specific tool and therefore, additional time.

Consequently, manufacturers are seeking solutions to simplify the manufacture of such panels, both for cost reasons and time reasons, while obtaining a composite panel with clear-cut contours.

An aim of the invention is to respond to this problem.

To this end, the invention proposes a process for manufacturing a composite panel, said process comprising the following steps:
a) providing at least one first ply of a woven or nonwoven dry material, said first ply defining a peripheral contour;
b) placing a structuring element inside the peripheral contour of said first ply, on at least one portion of this peripheral contour; then
$c_1$) either placing at least one second ply of a woven or nonwoven dry material, such that said second ply covers both the first ply and the structuring element;
$c_2$) or folding over at least one portion of the first ply, this portion comprising the peripheral contour, to cover the structuring element, then placing a second ply of a woven or nonwoven dry material, such that said second ply covers the first ply, but not the structuring element;
the stack thus formed at the end of step $c_1$) or $c_2$) already either being in a mould or outside of a mould and thus placed in said mould;
d) injecting a thermoplastic or thermosetting resin into the mould, in particular to impregnate the plies;
e) pressing the assembly into the mould to obtain the composite panel.

This process can also have at least one of the following features, taken individually or combined:
in the case where step $c_1$) is implemented, between steps b) and $c_1$), a portion of the first ply is folded over on the structuring element, this portion comprising said peripheral contour;
before or after the folding over of the portion in question of the first ply, but preferably before, an adhesive is applied on said portion of the first ply comprising said peripheral contour;
the material forming the first ply is selected from carbon fibres, glass fibres or Kevlar® fibres, whose generic description is para-aramid fibers;
the material forming the second ply is selected from carbon fibres, glass fibres or Kevlar® fibres;
the thermoplastic resin injected in step d) is selected from polyurethane, polyetherimide, or polyamide;
the thermosetting resin injected in step d) is selected from a thermosetting resin of epoxide, phenolic or urethane type;
step e) is accompanied by heating;
at the end of step e), a post-curing step f) is provided, advantageously carried out in the mould used to obtain the panel;
the structuring element placed during step b) on the first ply has the desired shape of the peripheral contour of the composite panel;
the structuring element is selected from an assembly of woven fibres, for example in the form of a braid; an assembly of nonwoven fibres, a thermosetting or thermoplastic resin, in solid form; a syntactic foam;
the structuring element consists of an assembly of woven or nonwoven fibres, said fibres being selected from carbon fibres, glass fibres, or Kevlar® fibres;
the assembly of woven or nonwoven fibres is pre-impregnated with a thermoplastic or thermosetting resin;
the assembly of woven or nonwoven fibres is pre-impregnated with a thermoplastic resin selected from polyurethane, polyetherimide, or polyamide;
the assembly of woven or nonwoven fibres is pre-impregnated with a thermosetting resin selected from a thermosetting resin of epoxide, phenolic or urethane type;
the assembly of woven fibres is presented in the form of a braid;
the structuring element is an epoxide type thermosetting resin.

The invention will be best understood and other aims, advantages and features of it will appear more clearly upon reading the following description and which is made regarding the following appended figures:

FIG. 1, which comprises FIGS. 1(*a*) to 1(*e*), represents a composite panel, in this case, a seatback for an aeroplane, obtained according to the first manufacturing process according to the invention;

FIG. 2, which comprises FIGS. 2(*a*) to 2(*d*), represents a composite panel, in this case, a seat armrest for an aeroplane, obtained according to a second manufacturing process according to the invention;

FIG. 3, which comprises FIGS. 3(*a*) to 3(*e*), represents the structure obtained at the end of different steps of manufacturing, according to the invention, a composite panel.

A first process for manufacturing a composite panel PC according to the invention, is described below.

This first embodiment is particularly well-adapted to manufacture a composite panel intended to form a seat component such as a back or a head support for which, at a given mass, a significant mechanical resistance is desirable.

The process comprises the following steps:
providing a first ply NP1 of a woven or nonwoven dry material, said first ply defining a peripheral contour CP;
placing a structuring element ES, namely either an assembly of woven fibres, being presented for example in the form of a braid EST, or an assembly of nonwoven fibres EF, inside the peripheral contour CP of said first ply NP1, on at least one portion of this peripheral contour; then:
either placing a second ply NP2 of a woven or nonwoven dry material, such that said second ply NP2 covers both the first ply NP1 and the structuring element ES,
or folding over a portion of the first ply NP1, this portion comprising the peripheral contour CP, to cover the structuring element ES, then placing a second ply NP2 of a woven or nonwoven dry material, such that said second ply NP2 covers the first ply NP1, but not the structuring element ES;

the stack thus formed at the end of the last step either already being in a mould, or outside of a mould, and thus placed in said mould, injecting a thermoplastic or thermosetting resin in the mould, in particular to impregnate the plies NP1, NP2;

pressing the assembly into the mould to obtain the composite panel.

The pressing step can be accompanied by heating.

By "dry" material (plies NP1, NP2), it must be understood that the ply is not a "prepreg". This is important as a ply NP1, NP2 made of a dry material, whether it is woven or nonwoven, has a great deformability, which greatly facilitates the handling thereof and the covering of another ply and/or the structuring element. Indeed, with "prepreg" plies, the covering, although possible, is not easy, and leads to an excess thickness which can be seen on the finally obtained composite panel; and this is not the case with plies made of "dry" material, since the resin injected in the mould will make it possible to better smooth out the level difference, in particular, in the case of a mould made of two corresponding portions. This is all the truer, that for the applications aimed for, the composite panel to be manufactured has a complex shape. With respect to a "prepreg", placing time is therefore saved, and consequently costs are saved. Moreover, as the placing of a ply made of dry fabric is easier than with a "prepreg", the mechanical strength of the composite part finally obtained is better for such a complex-shaped composite panel.

An example of a composite panel obtained at the end of this manufacturing process is represented in FIG. 1, in this case, when the structuring element is a braid EST; i.e. a particular case of an assembly of woven fibres. Moreover, below in the description, and to make it simple, the case of the braid EST will be considered as being representative of comments likely to be made for any assembly of woven fibres.

More specifically, FIGS. 1(a) and 1(b) represent, respectively according to a general, perspective view and according to a cross-sectional view in FIG. 1(b), the composite panel obtained at the end of the manufacturing process, in the case where the second ply NP2 covers both the first ply NP1 and the structuring element ES, in this case, a braid EST.

Moreover, in FIG. 1(b), the non-zero distance d can in particular be observed, separating the braid EST of the peripheral contour CP of the first ply NP1. This non-zero distance d shows that the braid EST is, during manufacturing, well placed inside the peripheral contour CP of said first ply NP1. Moreover, in this case, which is represented in the figures, the braid is presented inside the peripheral contour CP of the first ply NP1, over the whole of the peripheral contour of the first ply NP1.

Of course, the case presented supporting FIGS. 1(a) and 1(b) is applicable in the case where the braid EST is replaced by nonwoven fibres.

It must be noted that an additional step can be provided, after having placed the braid EST or the assembly EF of woven fibres, on the first ply NP1 and before covering it all by the second ply NP2, additional step during which a portion of the first ply NP1 is folded over around the braid EST or the assembly of EF fibres, this portion comprising said peripheral contour CP. Before the folding over of this portion of the first ply NP1, the peripheral contour CP is therefore situated externally with respect to the braid EST or the assembly of EF fibres; and this is no longer the case after folding over.

This is what is represented in FIG. 1(c). This case of reversing the first ply NP1 corresponds, for the second embodiment which will subsequently be described, to the diagram of FIG. 2(c).

This makes it possible to better maintain the braid EST or, as the case may be, the assembly EF of woven fibres, in place before pressurising, in the mould, of the stack formed by the first ply NP1, the braid EST or the assembly EF of woven fibres and the second ply NP2. In particular, there are less risks, during manufacturing, that the fibres of the end of the ply NP1 are found to be wedged in the mould. Moreover, on the finished part, the mechanical strength is improved, while limiting the excess thickness zone, to three plies (NP1, NP1, NP2). It must be noted that this additional step is not compulsory, but is sometimes very advantageous.

However, when this additional folding-over step is considered, it is advantageous, before or after the folding over, but preferably before, to apply an adhesive on the portion of the first ply NP1 comprising the peripheral contour CP. This indeed makes it possible to improve the maintenance of the portion of the first ply NP1 folded over against the braid EST or the assembly EF of woven fibres and therefore to be able, then, to place the second ply NP2 by ensuring that the relative positioning of the first ply NP1 and of the braid EST or the assembly EF of woven fibres has not changed.

In FIG. 1(d), according to a cross-sectional view, the positioning in the mould M has been represented, before pressing and heating different components of the composite panel to be manufactured, in the case where the second ply NP2 only covers the first ply NP1, without covering the structuring element, in this case, a braid EST.

With respect to the embodiment of FIG. 1(c), the advantages provided by the reversal of the first ply NP1 are conserved. Moreover, the implementation of the second ply NP2 can be easier. However, the excess thickness zone with three plies (NP1, NP1, NP2) is wider.

Selecting the configuration of FIG. 1(b), 1(c) or 1(d) will depend on the application considered.

Here, the non-zero distance d, separating the braid EST of the peripheral contour CP of the first ply NP1 must be sufficient such that the folding over of a portion of the first ply NP1 makes it possible to cover the braid. In FIG. 1(d), it can be noted that this distance d equals $d=d_1+d_2+d_3$. This distanced defines, the portion PR of the first ply NP1 which is folded over.

Of course, the case presented in FIG. 1(d) can be applied when the braid EST is replaced by an assembly EF of nonwoven fibres.

Figure 1E:
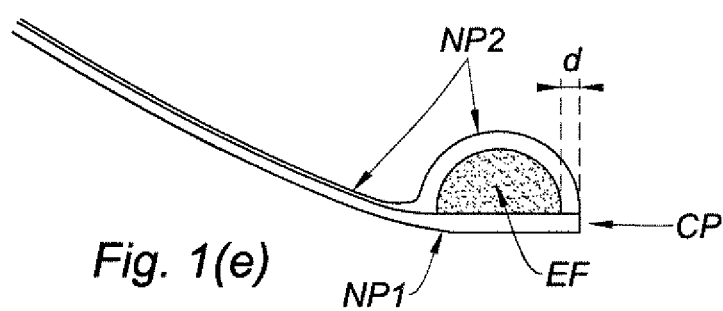

An assembly EF of nonwoven fibres is diagrammatically shown, according to a cross-section view, in FIG. 1(e). FIG. 1(e) simply corresponds to the case of FIG. 1(b), but with nonwoven fibres. The use of a braid EST or, as the case may be, an assembly EF of nonwoven fibres makes it possible to bring, on the composite panel PC finally produced at the end of the manufacturing process, the desired mechanical resistance.

The material forming the first ply NP1 can be selected from carbon fibres, glass fibres or Kevlar® fibres.

Moreover, the material forming the second ply NP2 can be selected from carbon fibres, glass fibres or Kevar® fibres.

A second ply NP2 made of a material identical to that forming the first ply NP1 can in particular be selected. In particular, the second ply NP2 can be made of carbon fibres, just like the first ply NP1.

Whichever the ply considered, carbon fibres can, for example, be presented in the form of a carbon fibre material.

Concerning the structuring element ES, the fibres of the braid EST (woven fibres) or nonwoven fibres can in particular be selected from carbon fibres, glass fibres or Kevlar® fibres.

The braid EST, or the assembly EF of nonwoven fibres, can be pre-impregnated with a thermoplastic or thermosetting resin.

The thermoplastic resin can thus be selected from polyurethane (PU), polyetherimide (PEI), or polyamide (PA). The thermosetting resin can be selected from a thermosetting resin of epoxide, phenolic or urethane type.

The braid EST or, as the case may be, the assembly EF of nonwoven fibres, is intended to define the shape of the peripheral contour of the composite panel, namely here the seat component to be manufactured.

To this end, it can be provided that the braid EST or, as the case may be, the assembly EF of nonwoven fibres already has, at the time of the positioning thereof on the first ply NP1, the desired shape of the contour for the composite panel. This can be produced in a specific mould, which is utilised to pre-impregnate the braid EST, or the assembly EF of nonwoven fibres, of thermoplastic or thermosetting resin. In this case, the steps of manufacturing the composite panel PC described above and produced in the mould (injection of resin, in particular to impregnate the plies; pressurised and possibly put under temperature) will only be used to ensure the mechanical bond between the first ply NP1, the braid EST or the assembly EF of nonwoven fibres, and the second ply NP2 to form the composite panel PC, the shape of the contour thereof having been defined above.

In a variant, the shaping of the braid EST or, as the case may be, of the assembly EF of nonwoven fibres, to that of the peripheral contour CP of the composite panel can be defined by that of the mould in the stack comprising the first ply NP1, the braid EST or as the case may be, the assembly EF of nonwoven fibres and the second ply NP2, for the pressurising thereof and possibly heated in order to actually obtain said composite panel PC. In this case, the braid EST or, as the case may be, the assembly EF of nonwoven fibres is not advantageously pre-impregnated before the positioning thereof on the first ply NP1, to facilitate the shaping thereof. Thus, the subsequent step of injecting thermoplastic or thermosetting resin is utilised, to impregnate the braid or the assembly of nonwoven fibres, the shaping of the structuring element ES to the peripheral contour of the composite panel thus being carried out at the time of the pressurising in the mould.

The solution consisting of preforming the braid EST or, as the case may be, the assembly EF of nonwoven fibres, in a specific mould is easier to implement than the solution consisting of forming the braid with the other components intended to form the composite panel.

When the braid EST or the assembly EF of nonwoven fibres is not impregnated with a thermoplastic or thermosetting resin before being put on the first ply, the shape of the braid EST can be defined by that of the mould in the stack comprising the first ply NP1, the braid EST and the second ply NP2, for the pressurising thereof and heating in order to actually obtain said composite panel PC.

The resin injected into the mould, to impregnate in particular the plies (but also the braid or the assembly of nonwoven fibres when, in particular, these have not been pre-impregnated), can be a thermoplastic resin selected from polyurethane (PU), polyetherimide (PEI), or polyamide (PA). For example, for polyetherimide (PEI), the injection is carried out, according to the exact nature of the polyetherimide used, at a pressure of between 70 MPa and 125 MPa and at a temperature of between 350° C. and 400° C. (in liquid form).

In a variant, the resin injected into the mould, to impregnate in particular the plies, can be a thermosetting resin selected from a thermosetting resin of the epoxide, phenolic or urethane type.

Typically, the step consisting of pressing the stack having been impregnated with resin in the mould is carried out under the following pressure conditions: pressure of at least 0.065 Mpa (20 in-Hg). The temperature during the pressing can go from the ambient temperature (no heating) to a few tens of degrees beyond the ambient temperature (heating) according to the chemical nature of the resin used.

Furthermore, it must be noted that the step of providing the first ply NP1 can consist of providing a plurality of first folded-over plies. Similarly, the step of placing the second ply NP2 can consist of placing a plurality of second folded-over plies, all covering both the first ply NP1 (or said plurality of first plies) and the braid EST or, as the case may be, the assembly of fibres EF, woven or nonwoven.

Furthermore, at the end of the steps described above, a post-curing can be provided, advantageously carried out in the mould in which the composite panel PC has been formed, to adjust the mechanical properties of the component.

A second process for manufacturing a composite panel, in this case, forming a seat component according to the invention is described below.

This second embodiment is particularly well adapted to manufacture a composite panel intended to form a seat component such as a side panel of an armrest for which, at a given mass, the mechanical resistance can be less than for a seatback, for example.

In this case, the structuring element ES is a thermoplastic or thermosetting resin ESR. In particular, but in a non-limiting manner, the resin thus used can be an epoxide-type thermosetting resin.

The process for manufacturing the panel thus comprising the following steps:

providing a first ply NP'1 of a woven or nonwoven dry material, said first ply defining a peripheral contour;

placing a structuring element ES, in this case, either a thermoplastic resin ESR or a thermosetting resin, in solid form, or a syntactic foam MS, inside the peripheral contour CP' of said first ply, on at least one portion of this peripheral contour, this structuring element ES' having a shape intended to define the shape of the contour of said composite panel; then either placing a second ply NP'2 of a woven or nonwoven dry material, such that said second ply NP'2 covers both the first ply NP'1 and the structuring element ES, or folding over at least one portion PR' of the first ply NP'1, this portion comprising the peripheral contour CP', to cover the structuring element then placing a second ply NP'2 of a woven or nonwoven dry material, such that said second ply NP'2 covers the first ply NP'1, but not the structuring element ES;

the stack thus formed at the end of this last step already being either in a mould, or outside of a mould and thus placed in said mould, injecting a thermoplastic or thermosetting resin in the mould, in particular to impregnate the plies NP'1, NP'2;

pressing the assembly in the mould to obtain the composite panel.

The pressing step can be accompanied by heating.

By "dry" material (plies NP'1, NP'2), it must be understood that the ply is not a "prepreg". The advantages that this provides, are the same as those outlined in support of the description of the first embodiment.

An example of a panel obtained at the end of this manufacturing process is represented in FIG. 2, according to a general perspective view in FIG. 2(a) and according to a cross-sectional view in FIG. 2(b), in the case where the structuring element is a resin ESR. This resin ESR can in particular be an epoxide-type thermosetting resin.

Figure 2D:
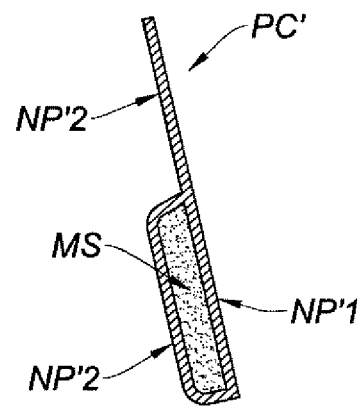

FIG. 2(d) corresponds to FIG. 2(b), but in the case of a syntactic foam MS. The syntactic form MS can, for example, be Airex® C70.90.

FIG. 2(c) more specifically shows the arrangement of the resin ESR and the plies, for this example. This corresponds to the case where the second ply NP'2 covers both the first ply NP'1 and the structuring element ES, in this case, a thermoplastic or thermosetting resin ESR or a syntactic foam MS.

Even more so, FIG. 2(c) is a case in which an additional step has been implemented.

Indeed, it must be noted that an additional step can be provided, after having placed the structuring element ES, in this case, the thermoplastic or thermosetting resin ESR on the first ply NP'1 and before covering it all by the second ply NP'2, during which a portion PR' of the first ply NP'1 is folded over on this thermoplastic or thermosetting resin ESR, this portion PR' comprising said peripheral contour CP'. Before folding over the first ply NP'1, this portion PR' is consequently situated externally with respect to the thermoplastic or thermosetting resin ESR, but this is no longer, after folding over this first ply NP'1.

This makes it possible to better maintain the thermoplastic or thermosetting resin ESR in place before the pressurising, in the mould, of the stack formed by the first ply NP'1, the thermoplastic or thermosetting resin ESR and the second ply NP'2. This is all the more advantageous as the resin, although solid during the placing thereof on the first ply, is relatively fragile, in particular compared with a braid or more generally, an assembly of fibres.

Moreover, the mechanical strength is thus of a better quality.

FIG. 2(c) moreover represents, schematically, the stack obtained in the vicinity of the peripheral contour CP' of the first ply NP'1 after folding over the first ply NP'1 on the thermoplastic or thermosetting resin ESR and after the covering, both of this thermoplastic or thermosetting resin ESR and of the first ply NP'1 by the second ply NP'2. In this FIG. 2(c), it is moreover noted that the non-zero distance d, already defined in reference to FIG. 1(b) or to FIG. 1(c) corresponds, in FIG. 2(c) to $d=d_1+d_2$.

This shows the passage that the structuring element ES, in this case the thermoplastic or thermosetting resin ESR is placed inside the peripheral contour CP' of the first ply NP'1. This also shows, that the folded over portion PR' of the first ply NP'1 is the portion situated, before folding over, externally to the resin ESR, and of which the total length equals $d_1+d_2$.

When this additional folding-over step is considered, which is the case in FIG. 2(c), it is advantageous, before or after the folding over, but preferably before, applying an adhesive on the portion of the first ply comprising the peripheral contour. This indeed makes it possible to improve the maintenance of the portion PR' of the first ply folded over against the thermoplastic or thermosetting resin ESR and therefore to be able to then place the second ply NP'2 by ensuring that the relative positioning of the first ply NP'1 and of said thermoplastic or thermosetting resin ESR has not developed.

It must be noted that this additional step is not compulsory. In the scope of this second embodiment, the configuration of FIG. 1(b) can therefore absolutely be implemented. The thermoplastic or thermosetting resin ESR thus simply replaces the braid EST.

Moreover, in the variant where the second ply NP'2 only covers the first ply NP'1, but not the structuring element ES, the configuration of FIG. 1(c) is explained for the first embodiment. The thermoplastic or thermosetting resin ESR (or as the case may be, the syntactic foam) thus simply replaces the braid EST (or as the case may be, the assembly of woven or nonwoven fibres).

Of course, the comments made above in support of FIG. 2 are applicable in the case where the thermoplastic or thermosetting resin ESR is replaced by a syntactic foam MS.

The material forming the first ply NP'1 can be selected from carbon fibres, glass fibres or Kevlar® fibres.

The material forming the second ply NP'2 can be selected from carbon fibres, glass fibres or Kevlar® fibres.

A second ply NP'2 made of a material identical to that forming the first ply NP'1 can in particular be selected. In particular, the second ply NP'2 can be made of carbon fibres, just like the first ply NP'1.

There again, whichever the ply considered, the carbon fibres can, for example, be presented in the form of a carbon fibre material.

Similarly, in the case of the braid or of the assembly of fibres, the thermoplastic or thermosetting resin ESR, solid, or as the case may be, the syntactic foam, thus makes it possible to define the shape of the contour of the composite panel PC' to be manufactured.

In practice, it is provided that the thermoplastic or thermosetting resin ESR or, at the case may be, the syntactic foam already has, at the time of the positioning thereof on the first ply NP'1, the desired shape of the contour for the composite panel PC'. This can be made in a specific mould. In this case, the steps of manufacturing the composite panel described above and made in the mould (injection of resin to in particular impregnate the plies, pressurised and heat) are used to ensure the mechanical bond between the first ply NP'1, the thermoplastic or thermosetting resin ESR or the syntactic foam MS and the second ply NP'2 to form the composite panel PC', the shape of the contour thereof having been defined above by the shaping of the resin or of the syntactic foam in a specific mould.

The resin injected in the mould can be a thermoplastic resin selected from polyurethane (PU), polyetherimide (PEI), or polyamide (PA). The injection conditions (pressure and temperature) are the same as those described for the first embodiment.

In a variant, the resin injected in the mould can be a thermosetting resin selected from a thermosetting resin of the epoxide, phenolic or urethane type.

The step consisting of pressing the stack having been impregnated with resin in the mould is carried out under pressure conditions, identical to those described above for the first embodiment. The same comment can be made for the temperature.

Furthermore, it must be noted that the step of providing the first ply NP'1 can consist of providing a plurality of first folded-over plies. Similarly, the step of placing the second ply NP'2 can consist of placing a plurality of second folded-over plies, all covering both the first ply NP'1 (or said plurality of first plies) and the thermoplastic or thermosetting resin ESR forming the structuring element.

Furthermore, after having obtained the composite panel PC', a post-curing can be provided, advantageously carried out in the mould in which the composite panel has been formed, to adjust the mechanical properties of the component. In practice, there is thus no need to remove the composite panel PC' from the mould, the post-curing being carried out by heating the mould.

The examples of application considered above are aimed at aeroplane seat components. Of course, other applications, for example, outside of the aeronautics field, can be considered.

EXAMPLE a test has been carried out to ensure of the feasibility of a composite panel intended to form a side panel for an aeroplane seat armrest.

A first woven ply made of carbon fibres has been provided (Carbone Satin 94900 6K 5HS of the company BGF). It can be seen in FIG. 3(*a*).

Then, an epoxide-type thermosetting resin (MAGNOBOND® 77-4 A/B) has been placed on the first ply, in solid form. The result can be seen in FIG. 3(*b*). The shape of the epoxide-type thermosetting resin has been defined above in a specific mould.

Then, a folding over of the portion of the first ply comprising said peripheral contour has been carried out on the epoxide-type thermosetting resin. In order to assist with the maintenance of the first ply on the epoxide-type thermosetting resin, an adhesive (AIRTEC 2) has been vaporised. The result can be seen in FIG. 3(*c*).

Then, a second ply identical to the first in the nature thereof (Carbone Satin 94900 6K 5HS of the company BGF) has been placed both on the first ply and on the epoxide-type thermosetting resin. The result can be seen in FIG. 3(*d*).

As can be observed, in this example, the stack of FIG. 3(*d*) has been made on a (lower) mould portion.

A thermosetting resin has then been injected in the mould, in this case, the resin EPOLAM 2015 SYSTEM of the company AXSON (Axson Technologies). For this resin, the injection has moreover been carried out at the ambient temperature (23° C.). To inject the resin, the mould has, in this case, been put under vacuum (0.1 MPa) to suction the resin in the mould. To this end, the mould is equipped with an orifice which makes it possible for a pump to put the mould under vacuum.

Then, the assembly has been maintained under vacuum (0.1 MPa), in this case, for 6 hours. It is understood that this maintaining under vacuum corresponds to a pressurising of the stack placed in the pressurised mould by the portions of the mould. No heating has been carried out during this pressurising, even though the pressurising has been carried out at ambient temperature (23° C.) in the mould.

Finally, a post-curing has then been carried out for 24 hours at 80° C., under vacuum (0.1 MPa), in this case, in the mould having been used to form the composite panel.

The side armrest panel finally obtained is represented in FIG. 3(*e*), on the inner side on the left and on the outer side on the right.

The invention claimed is:

1. A process for manufacturing a composite panel (PC, PC'), said process comprising the following steps:
    a) providing at least one first ply (NP1, NP1') of a woven or nonwoven dry material, said first ply defining a peripheral contour (CP, CP');
    b) placing a structuring element (ES; EST, EF, ESR) inside the peripheral contour of said first ply, on at least one portion of this peripheral contour; then
    $c_1$) either placing at least one second ply (NP2, NP'2) of a woven or nonwoven dry material, such that said second ply covers both the first ply and the structuring element;
    $c_2$) or folding over at least one portion (PR) of the first ply (NP1, NP'1), this portion comprising the peripheral contour (CP), to cover the structuring element (ES), then placing a second ply (NP2, NP'2) of a woven or nonwoven dry material, such that said second ply (NP2, NP'2) covers the first ply (NP1, NP'1), but not the structuring element (ES);
    the structuring element being thus arranged at the end of step $c_1$) or $c_2$) in such a way to later define a peripheral contour of the composite panel;
    the stack thus formed at the end of step $c_1$) or $c_2$) already being either in a mould or outside of a mould and thus placed in said mould,
    d) injecting a thermoplastic or thermosetting resin into the mould, to impregnate the plies (NP1, NP'1; NP2, NP'2); and
    e) pressing the assembly into the mould to obtain the composite panel, said pressing step shaping the structuring element to be the peripheral contour of the composite panel.

2. The process according to claim 1, wherein, in the case where step $c_1$) is implemented, between steps b) and $c_1$), a portion (PR') of the first ply (NP1, NP1') is folded over on the structuring element (ES), this portion (PR') comprising said peripheral contour (CP) of the first ply (NP1, NP1).

3. The process according to claim 1, wherein, before or after the folding over of the portion in question of the first ply (NP1, NP'1), an adhesive is applied on said portion (PR, PR') of the first ply (NP1, NP'1) comprising said peripheral contour (CP, CP') of the first ply (NP1, NP1').

4. The process according to claim 1, wherein the material forming the first ply (NP1, NP'1) is selected from carbon fibers or glass fibers.

5. The process according to claim 1, wherein the material forming the second ply (NP2, NP'2) is selected from carbon fibers or glass fibers.

6. The process according to claim 1, wherein the thermoplastic resin injected in step d) is selected from polyurethane (PU), polyetherimide (PEI), or polyamide (PA).

7. The process according to claim 1, wherein the thermosetting resin injected in step d) is selected from a thermosetting resin of the epoxide, phenolic or urethane type.

8. The process according to claim 1, wherein step e) is accompanied by heating.

9. The process according to claim 1, wherein, at the end of step e), a post-curing step f) is provided.

10. The process according to claim 1, wherein the structuring element (ES) is selected from:
    an assembly of woven fibres (EST);
    an assembly of nonwoven fibres (EF);
    a thermosetting or thermoplastic resin (ESR), in solid form;
    a syntactic foam (MS).

11. The process according to claim 10, wherein the structuring element (ES) consists of an assembly of woven or nonwoven fibres, said fibres being selected from carbon fibers or glass fibers.

12. The process according to claim 10, wherein the assembly of woven or nonwoven fibres is pre-impregnated with a thermoplastic or thermosetting resin.

13. The process according to claim 10, wherein the assembly of woven or nonwoven fibres is pre-impregnated with a thermoplastic resin selected from polyurethane (PU), polyetherimide (PEI) or polyamide (PA).

14. The process according to claim 10, wherein the assembly of woven or nonwoven fibres is pre-impregnated with a thermosetting resin selected from a thermosetting resin of epoxide, phenolic or urethane type.

15. The process according to claim 10, wherein the assembly of woven fibres is presented in the form of a braid (EST).

16. The process according to claim 1, wherein the structuring element (ES) is an epoxide-type thermosetting resin (ESR).

17. The process according to claim 1, wherein, at the end of step e), a post-curing step f) is carried out in the mould having made it possible to obtain the panel.

* * * * *